(12) United States Patent
Sherman et al.

(10) Patent No.: US 10,307,985 B2
(45) Date of Patent: Jun. 4, 2019

(54) ADHESIVES TO REPLACE INK STEP BEZELS IN ELECTRONIC DEVICES

(71) Applicant: 3M INNOVATIVE PROPERTIES COMPANY, St. Paul, MN (US)

(72) Inventors: Audrey A. Sherman, Woodbury, MN (US); Robert R. Kieschke, Woodbury, MN (US); Scott M. Tapio, Falcon Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/532,112

(22) PCT Filed: Dec. 16, 2015

(86) PCT No.: PCT/US2015/066060
§ 371 (c)(1),
(2) Date: Jun. 1, 2017

(87) PCT Pub. No.: WO2016/100493
PCT Pub. Date: Jun. 23, 2016

(65) Prior Publication Data
US 2017/0274623 A1    Sep. 28, 2017

Related U.S. Application Data

(60) Provisional application No. 62/094,203, filed on Dec. 19, 2014.

(51) Int. Cl.
*B32B 3/00* (2006.01)
*B32B 7/12* (2006.01)
(Continued)

(52) U.S. Cl.
CPC ............... *B32B 7/12* (2013.01); *B32B 5/142* (2013.01); *B32B 7/02* (2013.01); *B32B 17/06* (2013.01);
(Continued)

(58) Field of Classification Search
CPC ....... B32B 7/12; B32B 17/06; B32B 2307/42; B32B 2307/412; B32B 2457/20
See application file for complete search history.

(56) References Cited

U.S. PATENT DOCUMENTS

RE24,906 E     12/1960   Ulrich
5,314,748 A    5/1994    Mazurek
(Continued)

FOREIGN PATENT DOCUMENTS

EP    3 016 164    5/2016
KR    101064644    6/2010
(Continued)

OTHER PUBLICATIONS

The Handbook of Pressure Sensitive Adhesives, p. 172, paragraph 1 1989.
(Continued)

*Primary Examiner* — Elizabeth E Mulvaney (57) ABSTRACT

The present invention is a two-part adhesive layer including a first, optically clear adhesive composition and a second, light-blocking adhesive composition substantially surrounding the first, optically clear adhesive composition.

18 Claims, 3 Drawing Sheets

(51) Int. Cl.
- *B32B 27/08* (2006.01)
- *B32B 27/32* (2006.01)
- *B32B 27/36* (2006.01)
- *B32B 7/02* (2019.01)
- *B32B 17/06* (2006.01)
- *B32B 5/14* (2006.01)
- *C09J 7/10* (2018.01)
- *G02F 1/1333* (2006.01)

(52) U.S. Cl.
CPC .............. *B32B 27/08* (2013.01); *B32B 27/32* (2013.01); *B32B 27/36* (2013.01); *B32B 27/365* (2013.01); *C09J 7/10* (2018.01); B32B 2255/10 (2013.01); B32B 2255/26 (2013.01); B32B 2307/306 (2013.01); B32B 2307/40 (2013.01); B32B 2307/41 (2013.01); B32B 2307/412 (2013.01); B32B 2307/414 (2013.01); B32B 2307/418 (2013.01); B32B 2307/42 (2013.01); B32B 2307/732 (2013.01); B32B 2307/748 (2013.01); B32B 2419/00 (2013.01); B32B 2457/20 (2013.01); B32B 2457/202 (2013.01); B32B 2457/206 (2013.01); B32B 2605/006 (2013.01); C09J 2201/40 (2013.01); C09J 2201/606 (2013.01); C09J 2201/622 (2013.01); C09J 2203/318 (2013.01); G02F 2001/133331 (2013.01); G02F 2202/28 (2013.01)

(56) References Cited

U.S. PATENT DOCUMENTS

| | | |
|---|---|---|
| 2010/0086705 A1 | 4/2010 | Everaerts |
| 2011/0032205 A1 | 2/2011 | David |
| 2011/0084405 A1 | 4/2011 | Suzuki |
| 2012/0325402 A1* | 12/2012 | Suwa .................. B32B 37/1207 156/275.5 |
| 2013/0235515 A1 | 9/2013 | Ouderkirk |
| 2013/0321991 A1* | 12/2013 | Lee ............................ C09J 7/02 361/679.01 |
| 2014/0295150 A1 | 10/2014 | Bower |
| 2015/0208521 A1* | 7/2015 | Seo ..................... B32B 37/1284 361/746 |

FOREIGN PATENT DOCUMENTS

| | | |
|---|---|---|
| KR | 2014-0022532 | 2/2014 |
| WO | WO 2009-085662 | 7/2009 |
| WO | WO 2010-0132176 | 11/2010 |
| WO | 2011/0084405 | 7/2011 |

OTHER PUBLICATIONS

International search report for PCT International Application No. PCT/US2015/066060 dated May 19, 2016, 3pages.

Extended European Search Report issued in European Patent Application No. 15 87 0973.3., dated May 31, 2018.

* cited by examiner

ADHESIVES TO REPLACE INK STEP BEZELS IN ELECTRONIC DEVICES

TECHNICAL FIELD

The present invention is related generally to adhesives used in electronic devices. In particular, the present invention is an adhesive layer that performs both a bonding function and a light blocking or aesthetic function in electronic devices.

BACKGROUND

Capacitive touch technology has become relevant in an increasing number of applications, particularly in mobile hand-helds, netbooks and laptop computers. Compared to other touch technologies, capacitive touch enables very sensitive response as well as other features, such as multi-touch. Optically clear adhesives (OCAs) are often used for bonding purposes (e.g., attachment of different conductive layers) in the capacitive touch panel assembly. Not only do OCAs provide a mechanical bonding function, but they can also greatly increase the optical quality of the display by eliminating air gaps that reduce brightness and contrast.

There is currently an increasing need for soft OCAs. A "soft" OCA is defined as having low modulus and high tan delta values from dynamic mechanical analysis (DMA). These soft OCAs are desirable to enable better wetting of thick inks (e.g., 50 μm) on the display. Additionally, as a result of the display module assembly process, they can improve stress relief. Such stress relieving features are beneficial to reduce potential defects, such as Mura, when bonding a liquid crystal module and to minimize delayed-bubble formation.

However, because soft OCAs have to be both soft enough to conform and yet strong enough to bond, they can suffer from process disadvantages. It can be difficult to balance the need to be soft enough to conform and yet strong enough to bond in one material. Liquid OCAs (LOCAs) can be advantageous because they are flowable and can later be cured to build in internal strength to provide a bond. However, LOCAs also have certain process disadvantages as well. For example, while they can easily flow into the desired areas, they can also easily flow into undesired areas. In addition, the curing step means there is room for final assembly error if the cure is not sufficient. The curing step also adds time to the total assembly process.

SUMMARY

In one embodiment, the present invention is a two-part adhesive layer including a first, optically clear adhesive composition and a second, light-blocking adhesive composition substantially surrounding the first, optically clear adhesive composition.

In another embodiment, the present invention is a laminate including a first substrate, a second substrate and a two-part adhesive layer situation between and in contact with at least one major surface of the first substrate and at least one major surface of the second substrate. The two-part adhesive layer includes a first, optically clear adhesive composition and a second, light-blocking adhesive composition substantially surrounding the first, optically clear adhesive composition.

In yet another embodiment, the present invention is a method of forming a two-part adhesive layer including dispensing a first adhesive composition and dispensing a second adhesive composition substantially around the first adhesive composition. The first adhesive composition is optically clear and the second adhesive composition is light-blocking.

BRIEF DESCRIPTION OF THE DRAWINGS

These figures are not drawn to scale and are intended merely for illustrative purposes.

DETAILED DESCRIPTION

The present invention describes a novel two-part adhesive layer to perform both a bonding function and a light blocking or aesthetic function in electronic devices. The two-part adhesive layer eliminates the need for a material to conform to surface topographies or an ink step used in displays by removing the need for a separate ink layer. The two-part adhesive layer performs the same function as the ink in an ink step while also providing a bond. The present invention allows the precise control of both color and thickness of the two-part adhesive layer. In addition, using the two-part adhesive layer eliminates the need to 'flow' to fill small tight gaps under separately applied ink layers.

Two-Part Adhesive Layer

Figure 1:
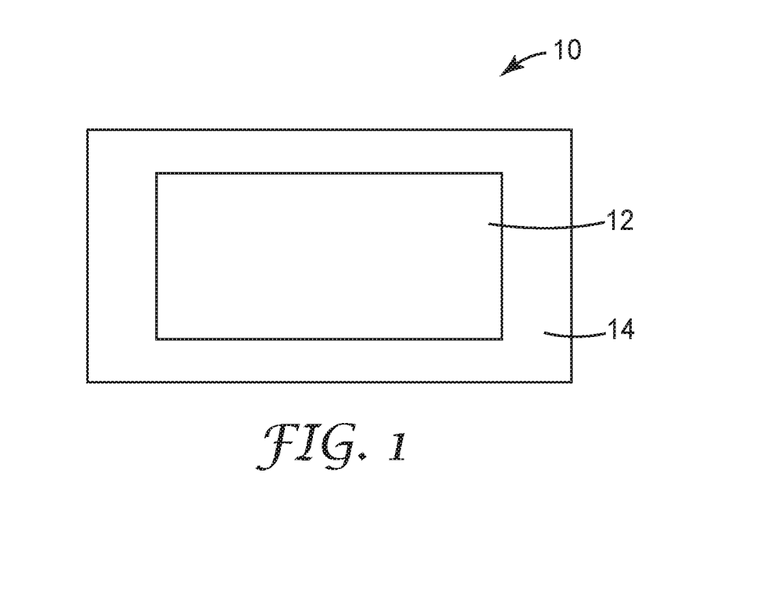
FIG. 1 is a top view of a two-part adhesive layer of the present invention.

FIG. 1 shows a top view of a two-part adhesive layer 10 of the present invention. The two-part adhesive layer 10 includes a first adhesive composition 12 and a second adhesive composition 14 substantially surrounding the first adhesive composition 12. The first adhesive composition 12 is optically clear and forms a window within the two-part adhesive layer 10. As used herein, the term "optically clear" refers to a material that has a luminous transmission of greater than about 90 percent, a haze of less than about 2 percent, and opacity of less than about 1 percent in the 400 to 700 nm wavelength range. Both the luminous transmission and the haze can be determined using, for example, ASTM-D 1003-95.

The second adhesive composition 14 is light-blocking. As used herein, the term "light-blocking" refers to a material that has a luminous transmission of less than about 90 percent, a haze of greater than about 2 percent, and opacity of greater than about 1 percent in the 400 to 700 nm wavelength range. Both the luminous transmission and the haze can be determined using, for example, ASTM-D 1003-95. The second, light-blocking adhesive composition 14 functions in part to block light and may also provide an aesthetic function. For example, the second, light-blocking adhesive composition 14 may be any number of different colors.

The first and second adhesive compositions 12 and 14 may be any adhesive, including, but not limited to: a pressure sensitive adhesive, a liquid adhesive, a curable liquid adhesive, a rubber, a gel or a self-wetting layer. The only limitation is that the first adhesive composition 12 is optically clear. In one embodiment, the first and the second adhesive compositions 12 and 14 are the same composition with similar adhesion properties, except that the second adhesive composition 14 includes a colorant, pigment or other additive. In another embodiment, the first and second adhesive compositions 12 and 14 are different compositions. For example, in one embodiment, the second adhesive composition 14 has stronger adhesive properties than the first adhesive composition 12. If the second adhesive composition 14 provides enough bond strength, the first adhesive composition 12 may have very little to no adhesive properties and may function simply to fill the area within the second adhesive composition 14 to keep air out.

A pressure sensitive adhesive (PSA) useful in the present invention can be any material that has pressure sensitive adhesive properties as described in The Handbook of Pressure Sensitive Adhesives, page 172, paragraph 1 1989. Further, useful pressure-sensitive adhesives are hot-melt processable and meet the Dahlquist criteria at use temperatures. Furthermore, each pressure sensitive adhesive composition can be a single pressure sensitive adhesive or a mixture of several pressure sensitive adhesives.

PSAs particularly useful in the present invention include natural rubbers, synthetic rubbers, styrene block copolymers, polyvinyl ethers, acrylics, poly-o-olefins, and silicones. Rubber-based PSAs include butyl rubber, copolymers of isobutylene and isoprene, polyisobutylene, homopolymers of isoprene, polybutadiene, and styrene/butadiene rubber. These PSAs may be inherently tacky or they may require tackifiers. Tackifiers include rosin ester resins, aromatic hydrocarbon resins, aliphatic hydrocarbon resins, mixed aromatic/aliphatic hydrocarbon resins, and terpene resins.

Another useful class of pressure-sensitive adhesives are those comprising synthetic rubber. Such adhesives are generally rubbery elastomers, which are either self-tacky or non-tacky and require tackifiers.

Other useful PSAs include thermoplastic elastomers. These PSAs include styrene block copolymers with rubbery blocks of polyisoprene, polybutadiene, poly(ethylene/butylene), poly(ethylene-propylene). Resins that associate with the rubber phase may be used with thermoplastic elastomer PSAs if the elastomer itself is not tacky enough. Examples of rubber phase associating resins include aliphatic olefin-derived resins, hydrogenated hydrocarbons, and terpene phenolic resins. Resins that associate with the thermoplastic phase may be used with thermoplastic elastomer PSAs if the elastomer is not stiff enough. Thermoplastic phase associating resins include polyaromatics, coumarone-indene resins, resins derived from coal tar or petroleum.

The PSA may be crosslinked to build molecular weight and strength of the PSA. Crosslinking agents may be used to form chemical crosslinks, physical crosslinks or a combination thereof, and they may be activated by heat, UV radiation and the like.

The PSA may be a stretch releasable PSA. Stretch releasable PSAs are PSAs that can be removed from a substrate if they are stretched at or nearly at a zero degree angle. In some embodiments, the stretch release PSA has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

Self-wetting adhesive compositions may also be used in the present invention. A self-wetting adhesive is an adhesive that spontaneously wets the display panel by pulling itself down using its own weight, with no added pressure, or with no more than finger pressure. The adhesive may be removable, i.e., the adhesive may have removable properties such that it can be bonded and removed from a substrate repeatedly for repositioning or reworking.

The adhesive compositions may also be a gel. Silicone gel coupling materials are remarkable in that they can display acceptable light stability, along with an ability to adequately relieve birefringence-inducing stress in a PBS assembly. Silicone gel coupling materials are also structurally stable. Silicone gel coupling materials do not expand or shrink when cured. Silicone gel coupling materials do not discolor of yellow after exposed to high intensity light. Silicone gel coupling materials are easy to handle as they do not flow. Even when cured, some silicones gel formulations induce minimal stress to the assembly.

The cross-linked or cross-linkable silicone gel described herein can be formed of any useful silicone materials such as, for example, dimethylsilicone, diphenylsilicone, or phenylmethylsilicone. In many embodiments, the cross-linked or cross-linkable silicone gel has a refractive index in a range from about 1.5 to about 1.6 or from about 1.5 to about 1.58, or from about 1.51 to about 1.57. In one embodiment, the cross-linked or cross-linkable silicone gel has a refractive index in a range from about 1.51 to about 1.53. In one embodiment, the cross-linked silicone gel can include phenylmethylsilicone moieties that are cross-linked. In another embodiment, the cross-linked silicone gel can include phenylmethylsilicone moieties which are cross-linked and phenylmethylsilicone oil. In some embodiments, the cross-linked silicone gel includes cross-linked phenylmethylsilicone moieties and phenylmethylsilicone oil in a weight ratio from about 1:5 to about 5:1, particularly about 1:4 to about 4:1, and more particularly 1:3 to about 3:1. In one embodiment, the cross-linked silicone gel includes cross-linked phenylmethylsilicone moieties and phenylmethylsilicone oil in a weight ratio from 1:3 to 1:1.

In some cases, the adhesive compositions include an adhesive that does not contain silicone. Silicones comprise compounds having Si—O and/or Si—C bonds. An exemplary adhesive includes a non-silicone urea-based adhesive prepared from curable non-silicone urea-based oligomers as described in WO 2009/085662, which is hereby incorporated by reference. A suitable non-silicone urea-based adhesive may comprise an X-B-X reactive oligomer and ethylenically unsaturated monomers. The X-B-X reactive oligomer comprises X as an ethylenically unsaturated group, and B as a non-silicone segmented urea-based unit having at least one urea group. In some embodiments, the adhesive layer is not microstructured.

Another exemplary adhesive includes a non-silicone urethane-based adhesive as described in International Publication No. WO2010/132176, which is hereby incorporated by reference. A suitable urethane-based adhesive may comprise an X-A-B-A-X reactive oligomer and ethylenically unsaturated monomers. The X-A-B-A-X reactive oligomer comprises X as an ethylenically unsaturated group, B as a non-silicone unit with a number average molecular weight of 5,000 grams/mole or greater, and A as a urethane linking group.

Other materials can be added to the adhesive compositions for special purposes, including, for example: oils, plasticizers, antioxidants, UV stabilizers, pigments, colorants, curing agents and polymer additives. For the first, optically clear adhesive composition, any other additives provided must not significantly reduce the optical clarity of the pressure sensitive adhesive.

The first and second adhesive compositions 12 and 14 of the two-part adhesive layer 10 have substantially the same thicknesses. The thickness of the two-part adhesive layer 10 can vary depending on the desired end product in which the two-part adhesive layer 10 will be used. In one embodiment, the two-part adhesive layer 10 has a thickness of from about 5 micron to about 2 millimeters, particularly from about 5 micron to about 250 microns, particularly from about 10 microns to about 250, more particularly from about 25 micron to about 150 micron, more particularly from about 25 micron to about 100 micron, and most particularly from about 25 to about 75 microns.

In practice, the two-part adhesive layer 10 forms a bezel with a transparent window in the center. The first, optically clear adhesive composition 12 forms the transparent window and is surrounded by the second, light-blocking adhesive composition 14. The first adhesive composition 12 functions to exclude air and reduce reflections and increase contrast. In one embodiment, the first adhesive composition 12 may be considered a contrast enhancing material.

Laminate

The two-part adhesive layer 10 can be used in a laminate 16 that is at least partially optically clear. The laminate 16, shown in cross-section in FIG. 2, includes a first substrate 18 having at least one major surface 22, a second substrate 20 having at least one major surface 24 and the two-part adhesive layer 10. Optically clear adhesives are commonly used to mount optical films, such as polarizers or retardation plates, to substrate displays, such as liquid crystal cells in LCD applications. As such, the two-part adhesive layer 10 including the transparent window is used to laminate the film to the substrate display to form an optically clear laminate. When used in a laminate, the two-part adhesive layer 10 allows the laminate 16 to remain virtually haze free or clear after exposure to non-ambient temperature and humidity conditions. The two-part adhesive layer 10 also desirably maintains optical clarity, bond strength, and resistance to delamination over the lifetime of the article in which it is used.

Figure 2:
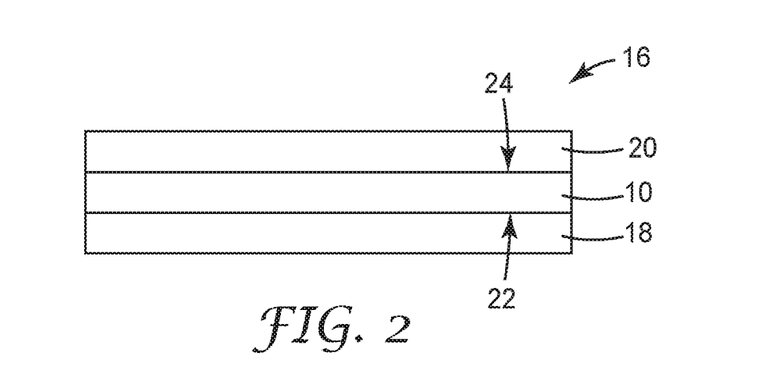
FIG. 2 is a cross-sectional view of a laminate including the two-part adhesive layer of the present invention.

In practice, the laminate 16 may include a first optical film or optically clear substrate 18 and a two-part adhesive layer 10 adjacent to at least one major surface 22 of the optical film or substrate 18. The laminate 16 can further include a second substrate 20 (e.g., permanently or temporarily attached to the two-part adhesive layer 10), another adhesive layer, or a combination thereof. As used herein, the term "adjacent" can be used to refer to two layers that are in direct contact or that are separated by one or more thin layers, such as primer or hard coating. Often, adjacent layers are in direct contact. Additionally, laminates 16 are provided that include a two-part adhesive layer 10 positioned between two substrates 18 and 20, wherein at least one of the substrates is an optical film. Optical films intentionally enhance, manipulate, control, maintain, transmit, reflect, refract, absorb, retard, or otherwise alter light that impinges upon a surface of the film. Films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Films for the provided laminates can also include retarder plates such as quarter-wave and half-wave phase retardation optical elements. Other optically clear films include anti-splinter films and electromagnetic interference filters.

In some embodiments, the resulting laminates can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, glazing (e.g., windows and windshields), screens or displays, cathode ray tubes, and reflectors.

Exemplary optically clear substrates include, but are not limited to a display panel, such as liquid crystal display, an OLED display, a touch panel, electrowetting display or a cathode ray tube, a window or glazing, an optical component such as a reflector, polarizer, diffraction grating, mirror, or cover lens, another film such as a decorative film or another optical film.

Representative examples of optically clear substrates include glass and polymeric substrates including those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes, polypropylenes, and cellulose triacetates. Typically, cover lenses can be made of glass, polymethyl methacrylates, or polycarbonate.

In other embodiments, at least one of the substrates 18 and 20 can be a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film.

The release liner can be removed to adhere the two-part adhesive layer 10 to another substrate (i.e., removal of the release liner exposes a surface of an adhesive layer that subsequently can be bonded to another substrate surface). Often, the two-part adhesive layer 10 is permanently bonded to this other substrate, although in some cases the adhesion may be limited to allow for reworking of the display.

The laminates 16 of the present invention have at least one of the following properties: the laminate 16 has optical transmissivity over a useful lifetime of the article in which it is positioned, the two-part adhesive layer 10 can maintain a sufficient bond strength between layers of the laminate 16, the two-part adhesive layer 10 can resist or avoid delamination, and the laminate 16 can resist bubbling of the two-part adhesive layer over a useful lifetime. The resistance to bubble formation and retention of optical transmissivity can be evaluated using accelerated aging tests. Laminates can often withstand exposure to elevated temperatures (e.g., 60 to 90° C.), optionally, under elevated humidity conditions (e.g., 80 to 90 percent relative humidity), for a period of time (e.g., 1 day to 1 month). In particular the laminates of this disclosure maintain their low haze and high transmission, even after prolonged exposure to elevated temperatures and elevated humidity (e.g., 60 to 90° C. and 80 to 90 percent relative humidity) for at least about 72 hours followed by a rapid cool down to ambient condition (e.g. cooling to room temperature within minutes after exposure to the elevated heat and elevated humidity).

In use, the two-part adhesive layer 10 of the present disclosure may be applied directly to one or both sides of an optical element such as a polarizer. The polarizer may include additional layers such as an anti-glare layer, a protective layer, a reflective layer, a phase retardation layer, a wide-angle compensation layer, and a brightness enhancing layer. In some embodiments, the two-part adhesive layer 10 of the present disclosure may be applied to one or both sides of a liquid crystal cell. It may also be used to adhere a polarizer to a liquid crystal cell. Yet another exemplary set of optical laminates include the application of a cover lens to a LCD panel, the application of a touch panel to an LCD panel, the application of a cover lens to a touch panel, or combinations thereof.

Method

Figure 3A:
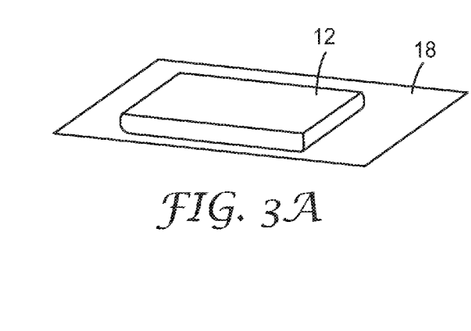
FIG. 3A is a perspective view of a first step of forming a laminate according to a first embodiment of the present invention.
Figure 3B:
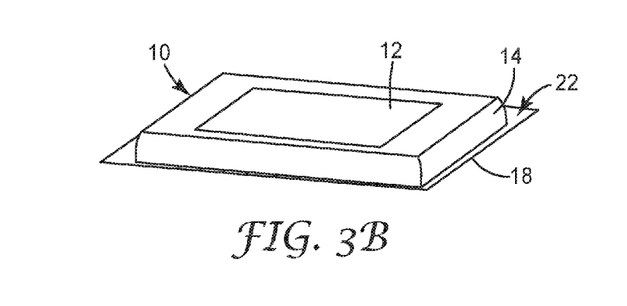
FIG. 3B is a perspective view of a second step of forming a laminate according to the first embodiment of the present invention.

A laminate 16 including the two-part adhesive layer 10 of the present invention can be formed by any method known to those of skill in the art as long as the border between the first, optically clear adhesive composition 12 and the second, light-blocking adhesive composition is defined. A first method of forming the laminate 16 is shown in FIGS. 3A-3D, which respectively show four steps in the process. As shown in FIG. 3A, in the first step, the first, optically clear adhesive composition 12 is dispensed onto a first major surface 22 of a first substrate 18. In one embodiment, the first substrate 18 may be a liquid crystal module or a touch sensor. The second, light-blocking adhesive composition 14 is then dispensed around the first, optically clear adhesive composition 12 (FIG. 3B), forming the two-part adhesive layer 10. In one embodiment, the first, optically clear adhesive composition 12 is used as a dam. Alternatively, the second, light-blocking adhesive composition 14 can be dispensed before the first, optically clear adhesive composition 12.

When forming the two-part adhesive layer 10, the edge between the first, optically clear adhesive composition 12 and the second, light-blocking adhesive composition 14 must be retained. Any method known to those of skill in the art can be used to achieve a defined edge. For example, in one embodiment, the first, optically clear adhesive composition 12 may be a precision die cut material with a sharp, precise edge, while the second, light-blocking adhesive layer 14 may be dispensed or a hot melt material. In a second embodiment, the first, optically clear adhesive composition 12 may be a stencil printed liquid optically clear adhesive that is thixotropic or cured in placed with the edge created by the stencil, while the second, light-blocking adhesive composition 14 is dispensed or a hot melt material. In a third embodiment, the second, light-blocking adhesive composition 14 may be a precision die cut material while the first, optically clear adhesive composition 12 may be a liquid optically clear adhesive dispensed within the second, light-blocking adhesive composition 14. As one of skill in the art will appreciate, these techniques can also be used to generate other edge shapes.

Figure 3C:
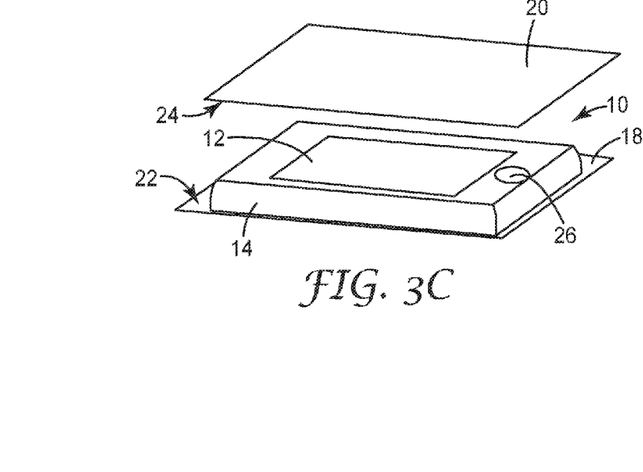
FIG. 3C is a perspective view of a third step of forming a laminate according to the first embodiment of the present invention.

Once the first and second adhesive compositions 12 and 14 have been deposited onto the first major surface 22 of the first substrate 18 to form the two-part adhesive layer 10, a first major surface 24 of a second substrate 20 is positioned on an opposing surface of the two-part adhesive layer 10 (FIG. 3C). In one embodiment, the second substrate 20 may be a glass cover. In one embodiment, prior to positioning the second substrate 20 on the two-part adhesive layer 10, any number of features 26 may be made or formed within the two-part adhesive layer 10 and particularly within the second, light-blocking adhesive composition 14. For example, a feature 26 may be die cut from the two-part adhesive layer 10.

Figure 3D:
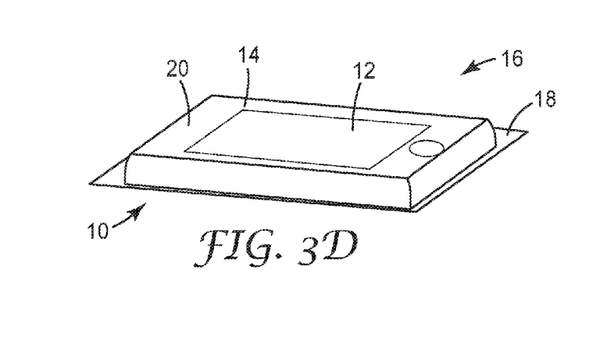
FIG. 3D is a perspective view of a fourth step of forming a laminate according to the first embodiment of the present invention.

After the two-part adhesive layer 10 is positioned between the first and second substrates 18 and 20 to form a laminate 16, the laminate 16 is cured (FIG. 3D). The laminate 16 may be cured by any method known to those of skill in the art. For example, the laminate 16 may be cured using ultra violet light or heat.

A second embodiment for forming a laminate 16 including the two-part adhesive layer 10 of the present invention is shown in FIGS. 4A-4E, which respectively show five steps in the process. In a first step shown in FIG. 4A, the first, optically clear adhesive composition 12 is dispensed on a first surface 22 of a first substrate 18. The first, optically clear adhesive composition 12 is then die cut and weed cleared. In a second step shown in FIG. 4B, the second, light-blocking adhesive composition 14 is coated around the first, optically clear adhesive composition 12, using the first, optically clear adhesive composition 12 as a dam between the parts. The first and second adhesive compositions 12 and 14 form the two-part adhesive layer 10. In one embodiment, the second, light-blocking adhesive composition 14 may be dispensed prior to the first, optically clear adhesive composition 12. As mentioned above with regard to the first method, the adhesive compositions 12 and 14 must be deposited such that the edge between the first, optically clear adhesive composition 12 and the second, light-blocking adhesive composition 14 is defined.

Figures 4A, 4B, 4C:
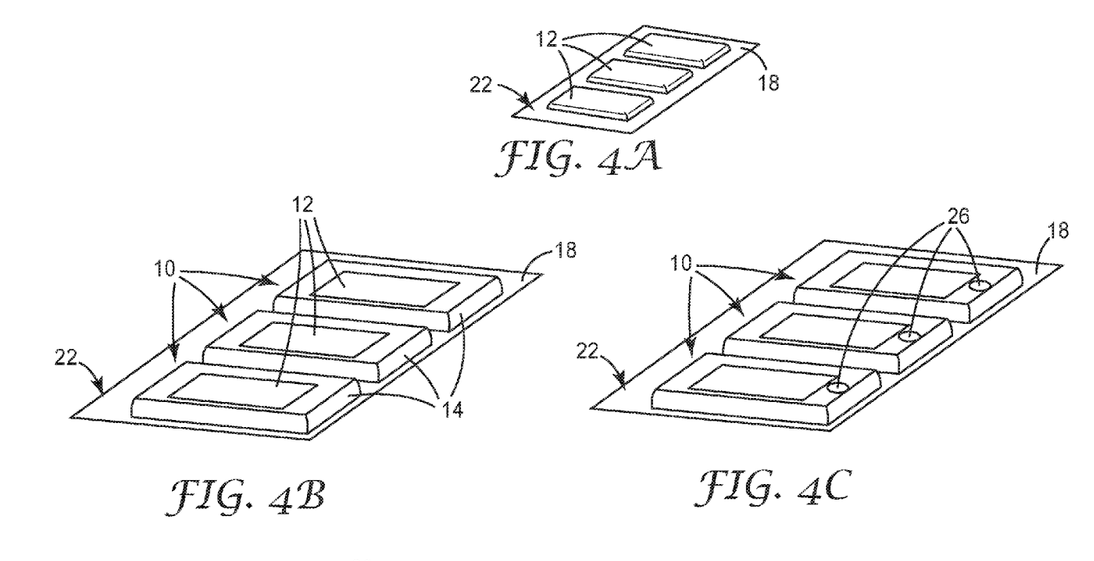
FIG. 4A is a perspective view of a first step of forming a laminate according to a second embodiment of the present invention.
FIG. 4B is a perspective view of a second step of forming a laminate according to the second embodiment of the present invention.
FIG. 4C is a perspective view of a third step of forming a laminate according to the second embodiment of the present invention.

Optionally, in a third step shown in FIG. 4C, features 26 may be formed, for example nu die cutting, in the two-part adhesive layer 10 where desired. Although FIGS. 4A-4C show three articles being made at a time using the second embodiment, any number of articles may be made without departing from the intended scope of the present invention.

Figure 4D:
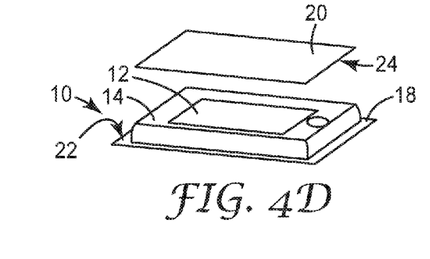
FIG. 4D is a perspective view of a fourth step of forming a laminate according to the second embodiment of the present invention.

Similar to the first embodiment, once the first and second adhesive compositions 12 and 14 have been dispensed onto the first major surface 22 of the first substrate 18, a first major surface 24 of a second substrate 20 is positioned on an opposing surface of the two-part adhesive layer 10 (FIG. 4D).

Figure 4E:
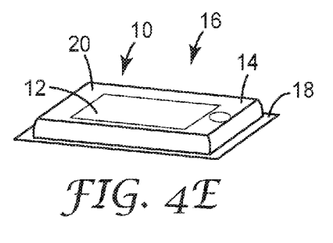
FIG. 4E is a perspective view of a fifth step of forming a laminate according to the second embodiment of the present invention.

Once the two-part adhesive layer 10 is positioned between the first and second substrates 18 and 20 to form a laminate 16, the laminate 16 is cured (FIG. 4E). The laminate 16 may be cured by any method known to those of skill in the art. For example, the laminate 16 may be cured using ultra violet light or heat.

One advantage of the two-part adhesive layer 10 and method of forming a laminate 16 of the present is reworkability. In one embodiment, the first and second substrates 18 and 20 may be removed from the two-part adhesive layer 10 upon heating. Depending on the compositions of the first and second adhesive compositions 12 and 14, the laminate 16 is heated until the two-part adhesive layer 10 begins to shrink in the x- and y-directions and expand in the z-direction. When this occurs, the first and second substrates 18 and 20 can be easily separated without damaging either of the substrates 18 and 20.

Example

The present invention is more particularly described in the following example that is intended as an illustration only, since numerous modifications and variations within the scope of the present invention will be apparent to those skilled in the art. Unless otherwise noted, all parts, percentages, and ratios reported in the following example are on a weight basis.

Preparation of a Foam Heat Debondable Tape

A 457 mm×160 mm section of CORTUFF film (available from Sealed Air Inc., Elmwood Park, N.J.) was nitrogen corona treated at 2.0 J/cm² and then primed with 3M adhesion promoter N200J (available from 3M Company, St. Paul, Minn.) at a concentration of 3% solids using a #8 Meyer rod and dried at 80° C. for one hour. The treated and primed film was laminated between 3M VHB tape 5930 and a DS4 transfer tape to yield a black foam heat debondable tape. DS4 is a pressure sensitive adhesive composition of 90:10 iso-octyl acrylate/acrylic acid prepared and coated from solvent as described in Ulrich RE 24,906.

Preparation of a Composite Structure

The black foam heat debondable tape having a thickness of about 795 microns was laminated to a ClearSIL T50 release liner (available from CP Films, Fieldale, Va.) and die-cut to create a rectangular opening with 1.5" by 2.5" dimensions in the tape. The cut rectangle of film was removed along with the corresponding portion of the release liner. Next, the remaining portion of the release liner was removed from the tape and the tape was laminated to another ClearSIL T50 release liner. A 100% solids mixture of a methacryloxyurea siloxane (as described in U.S. Pat. No. 5,314,748, Examples 1a and 1c, wherein the molecular weight of the silicone diamine was 5000 g/mole and containing 0.5% Darocur 1173) was poured into the cut out section to fill it. Next, a second ClearSIL T50 release liner was laminated over the top surface of the first release liner and the clear mixture to exclude oxygen from the clear mixture in the cut out section. This composite structure was then placed under low intensity UV exposure using 40 watt, 350 nanometer bulbs for 10 minutes to cure the methacryloxyurea siloxane mixture. The completed composite structure included a single layer laminated between release liners in which a black border of VHB Foam tape surrounded the cured optically clear adhesive central section. The border and central section were of similar thicknesses.

Preparation of a Heat Debondable Laminate

The cured composite structure was die cut to 2"×3" dimensions with the optically clear section centered in the die. After removal of one release liner, the cured composite structure was laminated to a glass microscope slide of the same dimensions. The other release liner was then removed and a second glass slide was laminated to the exposed surface. The composite structure was now laminated between glass surfaces to form a heat debondable laminate with an optically clear central section. The composite structure had a black border and an optically clear adhesive central section that adhered to the glass such that they could not be separated without damage. The black border blocked light and the optically clear central section transmitted light.

Temperature Response of the Heat Debondable Laminate

To test the impact of elevated temperature, the laminate was placed on a hot plate and heated to 275° F. For this test, the x-axis was defined as parallel to the 3" dimension of the laminate, the y-axis was defined as parallel to the 2" dimension of the laminate, and the z-axis was defined as perpendicular to the x- and y-axes (i.e., through the layers that comprise the laminate). At this temperature, the black foam heat debondable tape began to shrink in the x- and y-directions and expand in the z-direction. After approximately 5 minutes, the parts were easily separated without damage to either glass substrate.

Although the present invention has been described with reference to preferred embodiments, workers skilled in the art will recognize that changes may be made in form and detail without departing from the spirit and scope of the invention.

What is claimed is:

1. A two-part adhesive layer comprising:
   a first, optically clear adhesive composition; and
   a second, light-blocking adhesive composition substantially surrounding the first, optically clear adhesive composition,
   wherein the first, optically clear adhesive composition has a luminous transmission of greater than about 90%, a haze of less than about 2%, and opacity of less than about 1% in the 400 to 700 nm wavelength range.

2. The two-part adhesive layer of claim 1, wherein the second, light-blocking adhesive composition has a luminous transmission of less than about 90%, a haze of greater than about 2%, and opacity of greater than about 1% in the 400 to 700 nm wavelength range.

3. The two-part adhesive layer of claim 1, wherein the first, optically clear adhesive composition is a pressure sensitive adhesive.

4. The two-part adhesive layer of claim 1, wherein the second, light-blocking adhesive composition is a pressure sensitive adhesive.

5. The two-part adhesive layer of claim 1, wherein the two-part adhesive layer has a thickness of between about 5 microns and about 2 millimeters.

6. A laminate comprising:
   a first substrate;
   a second substrate; and
   a two-part adhesive layer situation between and in contact with at least one major surface of the first substrate and at least one major surface of the second substrate, wherein the two-part adhesive layer comprises:
   a first, optically clear adhesive composition; and
   a second, light-blocking adhesive composition substantially surrounding the first, optically clear adhesive composition, wherein the first, optically clear adhesive composition has a luminous transmission of greater than about 90%, a haze of less than about 2%, and opacity of less than about 1% in the 400 to 700 nm wavelength range.

7. The laminate of claim 6, wherein at least one of the first and second substrates is substantially transparent.

8. The laminate of claim 6, wherein the first substrate, the second substrate, or both the first substrate and the second substrate are selected from a display panel, a touch panel, an optical film, a cover lens, or window.

9. The laminate of claim 8, wherein the display panel is selected from a liquid crystal display, a plasma display, an OLED display, an electrowetting display, and a cathode ray tube display.

10. The laminate of claim 8, wherein the optical film is selected from a reflector, a polarizer, a mirror, an anti-glare or anti-reflective film, an anti-splinter film, a diffuser, or electromagnetic interference filter.

11. The laminate of claim 6, wherein the two-part adhesive layer has a thickness of between about 5 microns and about 250 microns.

12. The laminate of claim 6, wherein the laminate remains clear after it is placed in an environment of at least 60° C. and 80% relative humidity for at least 72 hours and cooled down to room temperature.

13. A method of forming a two-part adhesive layer comprising:

dispensing a first adhesive composition, wherein the first adhesive composition is optically clear; and dispensing a second adhesive composition, wherein the second adhesive composition is light-blocking, substantially around the first adhesive composition, wherein the first, optically clear adhesive composition has a luminous transmission of greater than about 90%, a haze of less than about 2%, and opacity of less than about 1% in the 400 to 700 nm wavelength range.

14. The method of claim 13, wherein the two-part adhesive layer has a thickness of between about 5 microns and about 2 millimeters.

15. The method of claim 13, wherein the second, light-blocking adhesive composition has a luminous transmission of less than about 90%, a haze of greater than about 2%, and opacity of greater than about 1% in the 400 to 700 nm wavelength range.

16. The method of claim 13, wherein the first and second adhesive compositions are dispensed onto a transparent substrate.

17. The method of claim 13, wherein the first adhesive composition is a pressure sensitive adhesive.

18. The method of claim 13, wherein the second adhesive composition is a pressure sensitive adhesive.

* * * * *

UNITED STATES PATENT AND TRADEMARK OFFICE
CERTIFICATE OF CORRECTION

PATENT NO. : 10,307,985 B2
APPLICATION NO. : 15/532112
DATED : June 4, 2019
INVENTOR(S) : Audrey Sherman et al.

Page 1 of 1

It is certified that error appears in the above-identified patent and that said Letters Patent is hereby corrected as shown below:

In the Specification

Column 9
Line 41 (approx.), delete "ClearSIL" and insert -- ClearaSIL --, therefor.

Column 9
Line 48 (approx.), delete "ClearSIL" and insert -- ClearaSIL --, therefor.

Column 9
Line 52 (approx.), delete "ClearSIL" and insert -- ClearaSIL --, therefor.

Signed and Sealed this
Thirty-first Day of March, 2020

Andrei Iancu
*Director of the United States Patent and Trademark Office*